United States Patent
Bevc et al.

(10) Patent No.: US 6,336,883 B1
(45) Date of Patent: Jan. 8, 2002

(54) DEVICE FOR TRANSMITTING TORQUE FROM AN INTERNAL COMBUSTION ENGINE TO A COMPRESSOR

(75) Inventors: Jürgen Bevc, Beckum; Michael Schütte, Iserlohn, both of (DE)

(73) Assignee: Winkelmann & Pannhoff GmbH, Ahlen (DE)

( * ) Notice: Subject to any disclaimer, the term of this patent is extended or adjusted under 35 U.S.C. 154(b) by 0 days.

(21) Appl. No.: 09/467,451

(22) Filed: Dec. 20, 1999

(30) Foreign Application Priority Data

Dec. 24, 1998 (DE) .......................... 198 60 150

(51) Int. Cl.$^7$ ............................................ F16H 55/14
(52) U.S. Cl. ....................................... 474/166
(58) Field of Search ............................ 464/89, 90, 46, 464/32, 83; 74/574, 573, 572; 474/94, 178, 112, 109, 70, 161, 166; 192/56.5, 209, 55.2, 200; 267/281; 123/559

(56) References Cited

U.S. PATENT DOCUMENTS

| | | | |
|---|---|---|---|
| 3,372,561 A | | 3/1968 | Howard et al. |
| 4,473,363 A | * | 9/1984 | McCutchan, Jr. ........... 474/161 |
| 4,578,047 A | | 3/1986 | Pissot |
| 4,722,722 A | * | 2/1988 | Rampe ...................... 474/161 |
| 4,946,427 A | * | 8/1990 | Rampe ...................... 474/161 |
| 5,377,962 A | * | 1/1995 | Ochs et al. ................. 267/281 |
| 5,426,304 A | * | 6/1995 | Lawrence et al. .......... 123/559 |
| 5,573,461 A | * | 11/1996 | Colford ................... 74/574 X |
| 5,591,093 A | * | 1/1997 | Asai et al. .................... 474/94 |
| 5,601,176 A | * | 2/1997 | Ishimaru et al. ............. 192/200 |
| 5,695,176 A | * | 12/1997 | Colford ................... 74/574 X |
| 5,735,746 A | * | 4/1998 | Colford ........................ 464/83 |
| 5,788,576 A | * | 8/1998 | Varin .......................... 464/83 |
| 6,044,943 A | * | 4/2000 | Bytzek et al. ......... 192/55.2 X |
| 6,083,130 A | * | 7/2000 | Mevissen et al. ............. 474/70 |
| 6,106,421 A | * | 8/2000 | Graber et al. ............. 74/574 X |
| 6,200,221 B1 | * | 3/2001 | Maejima et al. ............... 464/46 |

FOREIGN PATENT DOCUMENTS

| | | |
|---|---|---|
| DE | 6910144 | 3/1969 |
| DE | 4300083 | 7/1994 |
| DE | 198 21 990 | 11/1998 |
| GB | 1472484 | 5/1977 |
| JP | 10159866 | 6/1998 |

* cited by examiner

Primary Examiner—David A. Bucci
Assistant Examiner—Colby Hansen
(74) Attorney, Agent, or Firm—Rosenman & Colin L

(57) ABSTRACT

A device for transmitting a torque from an internal combustion engine to a secondary assembly, in particular the compressor of an air conditioning system of a motor vehicle, with a hub for connection to the secondary assembly shaft and with a belt pulley arranged rotatably on the secondary assembly housing, the belt pulley and the hub being connected to one another via one component (14) for vibration damping and via another component (8) for overload protection, the overload protection being designed in such a way that the connection between the belt pulley and hub is broken when a predetermined torque is exceeded, is to be improved in such a way that both the desired vibration damping is ensured and an exactly responding and functionally reliable overload protection is ensured.

This is achieved in that the component for overload protection is formed by a driver disk (8) which is positively held fixedly in terms of rotation on the hub (2) in such a way that the transmission of force between the hub (2) and the driver disk (8) is terminated directly and permanently when a specific predetermined torque is exceeded.

8 Claims, 3 Drawing Sheets

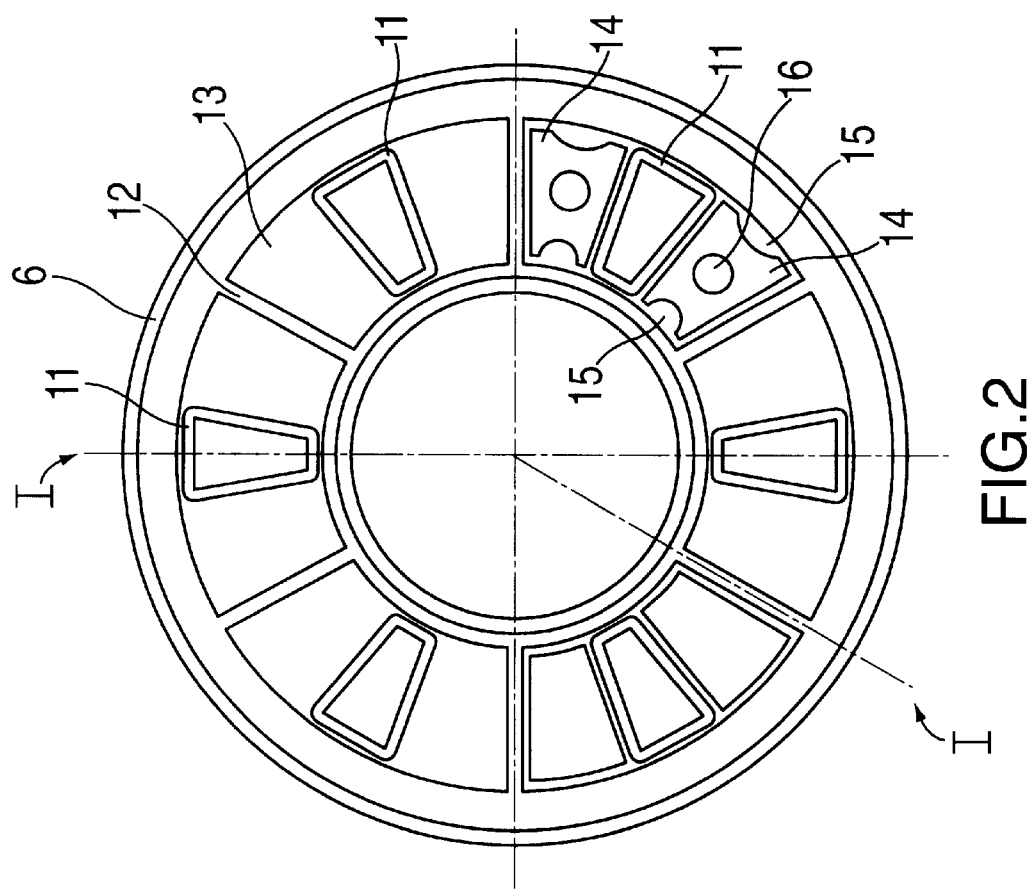
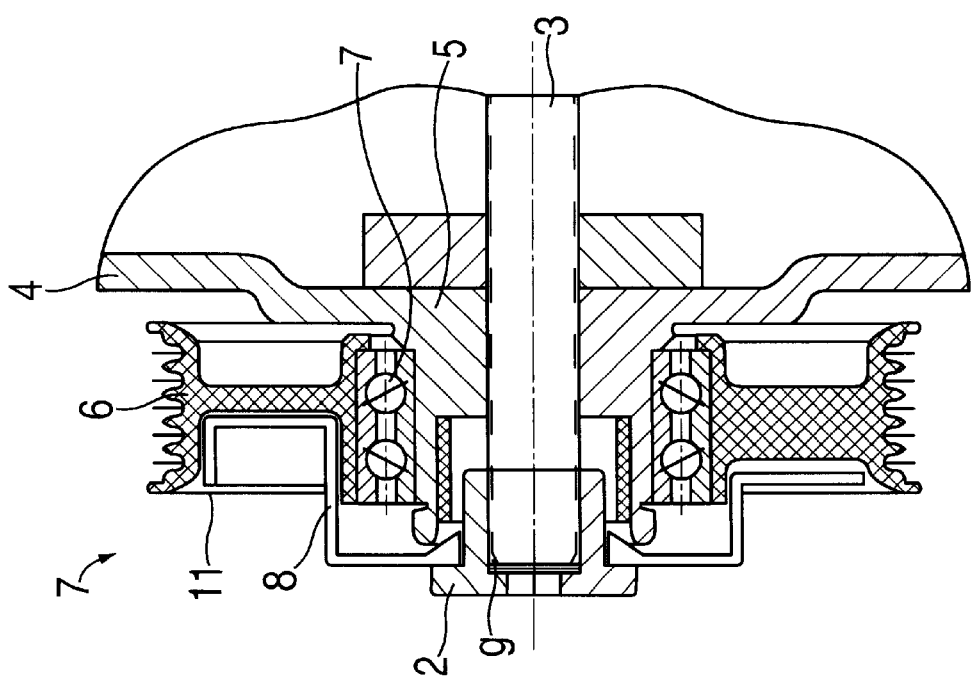

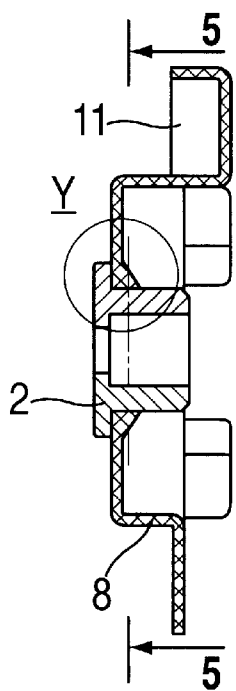
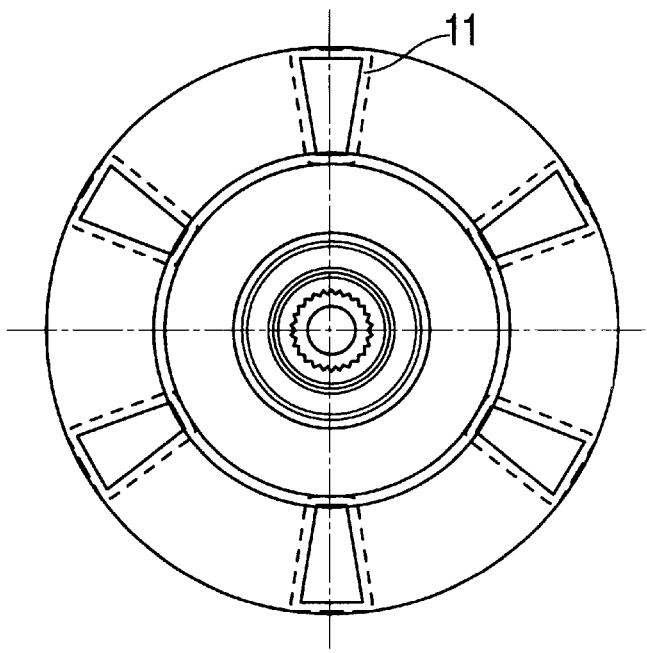
FIG. 3
FIG. 4
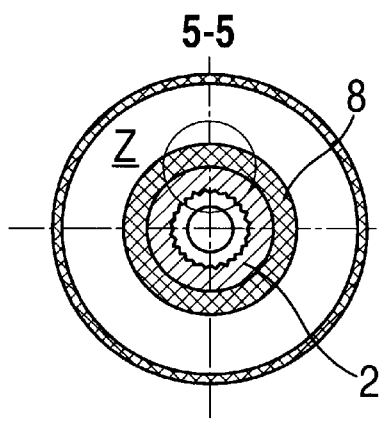
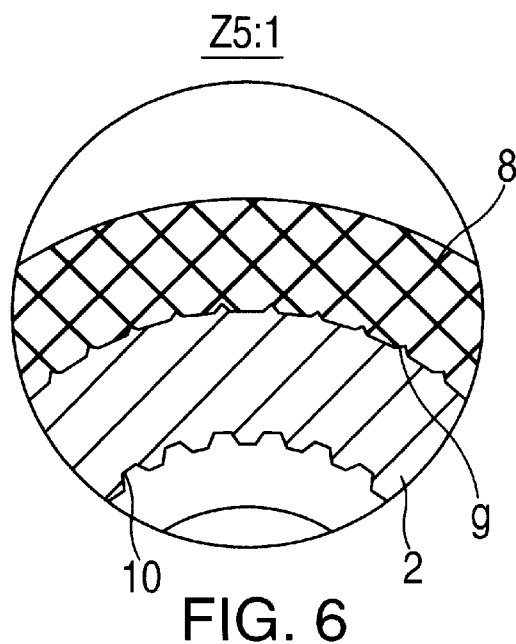
FIG. 5
FIG. 6

DEVICE FOR TRANSMITTING TORQUE FROM AN INTERNAL COMBUSTION ENGINE TO A COMPRESSOR

FIELD OF INVENTION

The present invention relates to a device for transmitting torque from an internal combustion engine to a secondary assembly, in particular to a compressor of an air conditioning system of a motor vehicle.

BACKGROUND OF INVENTION

In motor vehicles equipped with an air conditioning system, the compressor of the air conditioning system is usually driven by the crankshaft of the internal combustion engine via a belt drive. If the compressor of the air conditioning system fails, the result is that the entire drive train of the motor vehicle is blocked and the vehicle is no longer drivable. In order to remedy this deficiency, European Application (EP) 0,793,031 A1 discloses a device in which a means for vibration damping and for overload protection is arranged between the compressor belt pulley connected to the crankshaft via a belt drive and the hub of a compressor shaft. The vibration damping means is intended to ensure that when a predetermined torque, specifically the torque occurring due to the standstill of the compressor, is exceeded, the compressor shaft is uncoupled from the belt pulley, so that the belt pulley can rotate freely and the functioning of the remaining drive train is not impaired if the compressor fails. In addition to this overload protection, the known vibration damping device also provides, at the same time, vibration damping, in order to keep away from the compressor or the compressor shaft harmful vibrations which are transmitted from the crankshaft to the belt pulley via the belt drive. In this context, the known vibration means is formed by an elastic driver element which is connected fixedly to the hub of the compressor shaft and, on the outside, is connected to the belt pulley elastically in a particular way. The elasticity of this driver element is dimensioned in such a way that, when a predetermined torque occurs, this driver element slips and thus ensures overload protection.

Since this driver element serves both for vibration damping and for overload protection, it has proved very difficult, in practice, to design this driver element exactly in such a way that it both performs the vibration damping function satisfactorily and ensures overload protection exactly when the predetermined torque occurs.

A generic device is known from German Patent Application 198 21 990 A1. In this device, the means for vibration damping and overload protection is formed by two separate components. The vibration damping means is formed by a rubber ring and the overload protection is formed by a coiled spring which is mounted on the drive shaft and is arranged and designed in such a way that it is deformed when the load arises. If the overload situation occurs, the transmission of torque from the drive shaft to the belt pulley is interrupted reversibly, as long as the overload occurs. It is difficult, however, to design such a spring exactly in such a way that it ensures the overload function reliably when the predetermined torque arises. Moreover, if the overload torque fluctuates, a virtually oscillating state may be established since the coiled spring transmits the torque or not, depending on the torque.

A similar device is known from U.S. Pat. No. 3,372,561. In this device, too, the overload protection has a spring element, thus entailing the same disadvantages.

SUMMARY OF THE INVENTION

An object of the invention therefore is to improve a generic device in such a way that both the desired vibration damping is ensured and an exactly responding and functionally reliable overload protection is ensured.

In a device of the type designated initially, this object is achieved, according to the invention, in that the component for overload protection is formed by a driver disk which is held positively on the hub in such a way that the transmission of force between the hub and the driver disk is terminated directly and permanently when a specific predetermined torque is exceeded.

According to the invention, therefore, a device is proposed, in which uncoupling of the two functions likewise takes place—that is to say one component is provided for vibration damping and the other for overload protection. The components can therefore be designed separately from one another, so that both satisfactory vibration damping and exactly responding overload protection in the case of a predetermined torque can be ensured. At the same time, the design of the overload protection reliably ensures that, when the overload torque arises, irreversible separation takes place between the hub and the driver disk, so that after the overload situation has arisen, further transmission of torque is ruled out. Undesirable instances of damage in the drive train when an overload torque arises on the secondary assembly can consequently be reliably avoided.

There is provision, particularly preferable, for the component for overload protection to be formed by a driver disk which is positively and/or nonpositively held fixedly in terms of rotation on the hub in such a way that the connection is broken in the case of a specific predetermined torque. In this case, the positive and/or nonpositive hold can be implemented in various ways. There being provision, particularly preferably, for the positive and/or nonpositive connection between the driver disk and the hub to be formed by a profiling resembling a splined shaft and having indented splines. In this case, the positive and/or nonpositive connection is then designed in such a way that, when a predetermined torque occurring due to the standstill of the compressor shaft is exceeded, the profiling resembling a splined shaft can slip freely, so that transmission of torque between the hub and driver disk is canceled.

The driver disk is preferably composed of plastic, while the hub consists, for example, of sintered metal. A suitable choice of the plastic and profiling then makes it possible, depending on the blocking torque caused by the standstill of the compressor to achieve an exact design such that the overload protection takes effect precisely when the compressor is at a standstill.

In a further advantageous embodiment, there is provision for the driver disk to be provided at the outer edge with drivers spaced circumferentially from one another. Each driver in each case engages into a driver space of the belt pulley. The drives space is delimited in each case by radial ribs. The component for vibration damping is formed by elastomeric elements coming to bear between the edges of the respective driver and the associated ribs of the belt pulley. The elastomeric elements may then be designed in a controlled manner such that the desired vibration damping can be implemented, irrespective of how the overload protection is designed.

The elastomeric elements may be designed in various ways may therefore be advantageously designed as a common annular part, thus making assembly particularly simple.

They may, alternatively also be vulcanized onto the respective ribs of the belt pulley or onto the respective driver.

There is provision, in a particularly advantageous way, for the elastomeric elements to have a concavely curved design at the radial ends and to be provided centrally with a central hole. Under pressure stress, the central hole is then deformed elliptically and the rubber deflected outward can be pressed into the radial concavely curved portions and therefore not undergo any friction on the belt pulley.

BRIEF DESCRIPTION OF THE DRAWINGS

The invention is explained in more detail with reference to the drawings in which:

FIG. 1 shows a section through a device according to the invention along the line I—I in FIG. 2;

FIG. 2 shows a side view of the device illustrated in FIG. 1;

FIG. 3 shows a longitudinal section through the overload protection means of the device;

FIG. 4 shows a side view of FIG. 3;

FIG. 5 shows a section along the line 5—5 in FIG. 3;

FIG. 6 shows an enlarged detail designated by Z in FIG. 5; and

DETAILED DESCRIPTION OF THE PREFERRED EMBODIMENT

Figure 7:
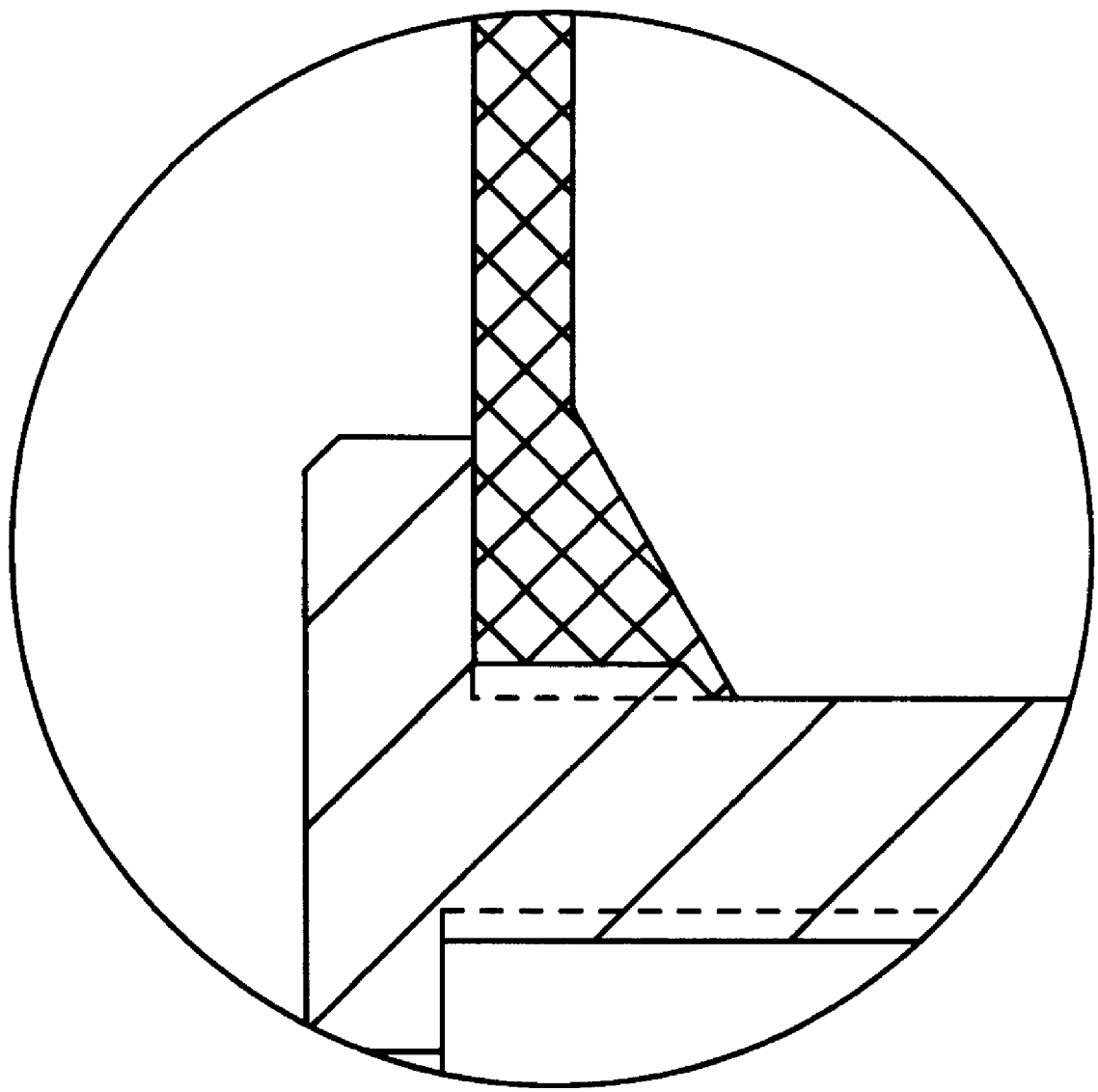
FIG. 7 shows an enlarged detail designated by Y in FIG. 3.

Referring now to the drawings in which like numerals represent like elements throughout the various views, a device according to the invention for transmitting a torque from an internal combustion engine, (not illustrated), to a compressor is designated in general by 1 in FIG. 1. This device 1 has a hub 2 for rotationally fixed connection to a compressor shaft 3 of a compressor of an air conditioning system or the like. The compressor housing 4 of this compressor is merely indicated in FIG. 1. A belt pulley 6, here a poly-V-belt pulley, is mounted rotatably on a journal-like extension 5 of the compressor housing 4, for which purpose a bearing 7 is provided.

The belt pulley 6 is preferably connected, via a poly-V-belt (not illustrated), to the crankshaft of an internal combustion engine of a motor vehicle and is thus driven by this crankshaft. The belt pulley 6 helps drive the compressor shaft 3 and subsequently the compressor. In order to bring this about, a means for vibration damping and for overload protection, which is formed by two separate components, is provided between the belt pulley 6 and the hub 2. The component for overload protection is formed by a driver disk 8 which is arranged positively and/or nonpositively on the hub 2. The positive and/or nonpositive connection between the driver disk 8 and the hub 2 is formed, in this case, preferably by a profiling 9 resembling a splined shaft and having indented splines, as may be gathered best from FIG. 6. It can also be inferred from this figure that the hub 2 is arranged on the compressor shaft 3, preferably via a conventional splined shaft profile 10.

The driver disk 8 is preferably composed of plastic and the hub 3 preferably of a suitable metal, so that an appropriate choice of material and a suitable geometric design of the profiling 9 resembling a splined shaft makes it possible to design the overload protection in a controlled manner. The design is such that when the compressor shaft is at a standstill due to a fault in the compressor and a corresponding torque therefore arises, the driver disk 8 "slips" freely and irreversibly on the hub 3. Thus, when the overload situation arises, the connection between the hub 3 and the driver disk 8 is terminated directly and permanently.

The driver disk 8 is provided at the outer edge with drivers 11 spaced circumferentially from one another. Each driver 11 in each case engages into a driver space 13 of the belt pulley 6. The driver space is delimited in each case by radial ribs 12. For vibration damping, elastomeric elements 14, which ensure vibration damping, are provided between the edges of the respective driver 11 and the associated ribs 12 of the belt pulley 6. When the belt pulley 6 rotates due to being driven by the crankshaft of the internal combustion engine via the belt drive (not illustrated), the rotational movement of the belt pulley 6 is transmitted to the hub 2 via the drivers 11. The elastomeric elements 14 which then come to bear correspondingly on the ribs 12 with a damping effect, as long as the overload protection between the driver disk 8 and the hub 2, occurring when the compressor shaft 3 is at a standstill due to damage, does not take effect.

As may be gathered best from FIG. 2, the respective elastomeric element 14 is preferably shaped to be semicircularly concavely curved at the two radial ends. These concavely curved portions are designated by 15. Moreover, each elastomeric element 14 is provided with a central hole 16. This affords the advantage that, during the driving movement, the central hole 16 is deformed elliptically and, at the same time, the outer edges of the elastomeric element 14 can be deformed into the semicircularly convexly curved portions 15, without coming to bear frictionally on the belt pulley 6.

The elastomeric elements 14 may form a common annular element. They may also be vulcanized onto the ribs 12 of the belt pulley 6 or onto the drivers 11. They may also be designed as an individual part, as illustrated in FIG. 2.

The invention is not, of course, restricted to the exemplary embodiment illustrated. Further embodiments are possible, without departing from the basic concepts of the invention. For example, the positive and/or nonpositive connection between the hub 2 and the driver disk 8 may also be made in another way, if, for instance, separation of the overload protection and vibration damping is ensured by separate components.

What is claimed is:
1. A device for transmitting a torque from an internal combustion engine to a secondary assembly, particularly the secondary compressor of an air conditioning system of a motor vehicle, said device comprising:

a hub for connection to a secondary assembly shaft;

a belt pulley arranged rotatably on the secondary assembly housing;

a vibration damping component connecting the belt pulley and the hub;

an overload protection component, wherein the connection between the belt pulley and hub is broken when a predetermined torque is exceeded, said overload protection component being formed by a driver disk which is positively held fixedly in terms of rotation on the hub in such a way that the transmission of force between the hub and the driver disk is terminated directly and permanently when a specific predetermined torque is exceeded.

2. The device of claim 1, further comprising a profiling wherein the positive connection between the driver disk (8) and the hub (2) is formed by said profiling (9) resembling a splined shaft and having indented splines.

3. The device of claim 1, wherein the driver disk is composed of plastic.

4. The device of claim 1, further comprising drivers, wherein the driver disk (8) is provided at the outer edge with said drivers (11) and said drivers are spaced circumferentially from one another, each driver (11) in each case engaging into a driver space (13) of the belt pulley (6), said driver space being delimited in each case by radial ribs (12), and the component for vibration damping being formed by elastomeric elements (14) coming to bear between the edges of the respective driver (11) and the associated ribs (12) of the belt pulley (6).

5. The device of claim 4, wherein all the elastomeric elements are designed as a common annular part.

6. The device of claim 4, wherein the elastomeric elements are vulcanized onto the respective ribs of the belt pulley.

7. The device of claim 4, wherein the respective elastomeric m elements are vulcanized onto the respective driver (11).

8. The device of claim 4, wherein the elastomeric elements have a concavely curved design at the two radial ends and are provided centrally with a central hole.

* * * * *